United States Patent Office 2,972,371
Patented Feb. 21, 1961

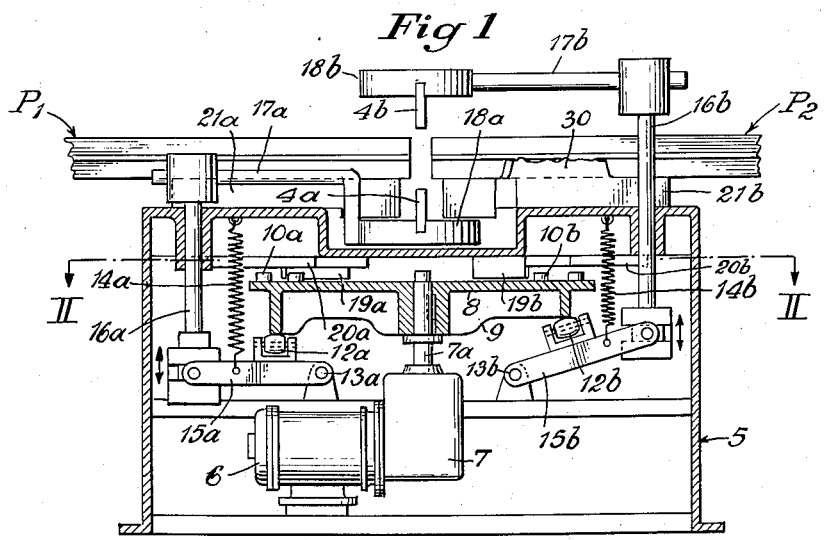
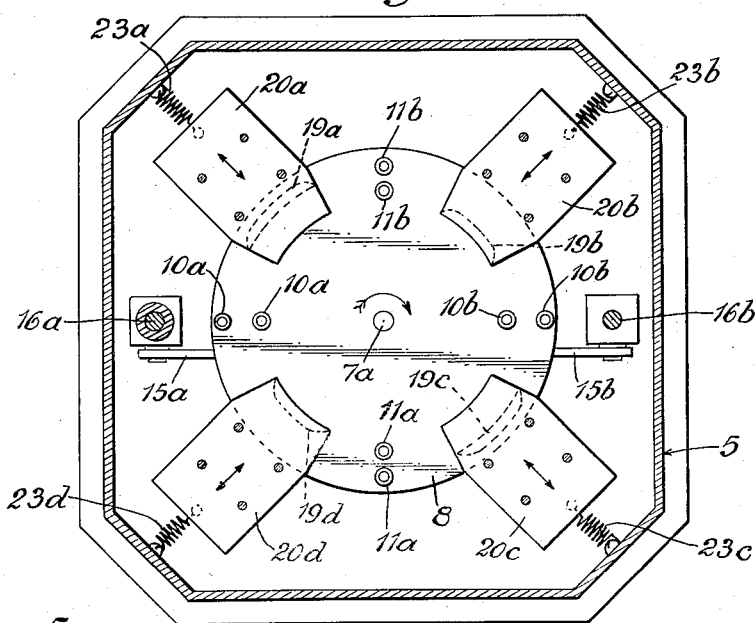
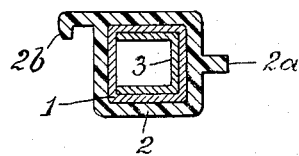

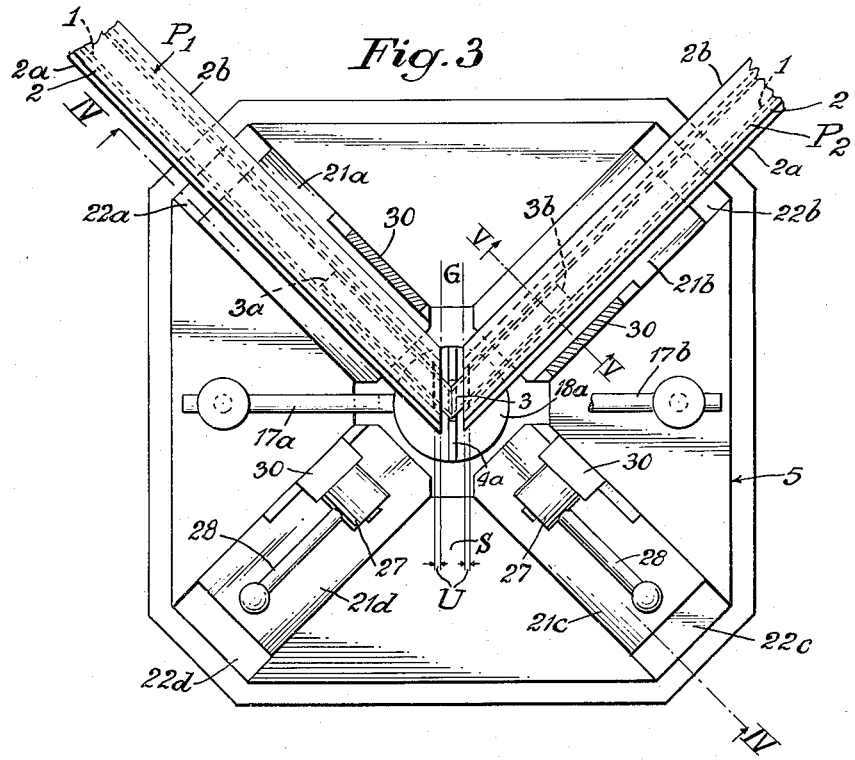
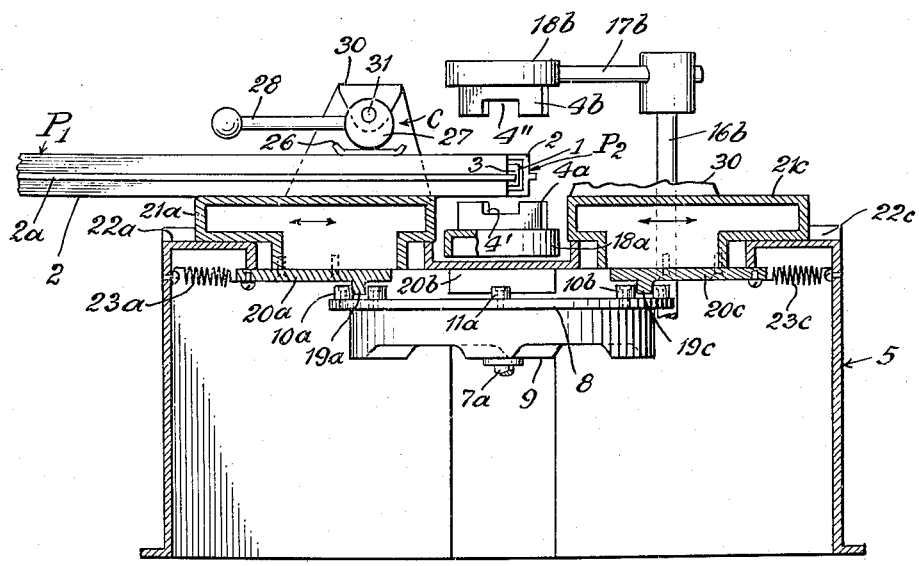

2,972,371

METHOD AND DEVICE FOR BUTT WELDING OF BAR SHAPED STRUCTURAL MEMBERS

Ludwig Hermann, Oktaviostrasse 2, and Heinz Pasche, Luetkensallee 3A, both of Hamburg-Wandsbek, Germany Filed Feb. 19, 1958, Ser. No. 716,126

Claims priority, application Germany Feb. 20, 1957

5 Claims. (Cl. 154—42)

The invention relates to improvement in a method and a device for butt-welding of end-drilled solid bar-shaped structural members or tubular bar-shaped structural members made of steel or other metal, and whose exterior is covered by a layer or sleeve of a thermoplastic synthetic material. Structural members of this type are cut to the desired length and are then assembled to form for instance window frames and door frames.

It is an object of the invention to unite these structural members at those points where two or more meet one another, for instance where an angle is formed or a T or a cross, and also at those points where mitered ends meet. The connection at these points takes place by abutment to form jointless seams by welding. The abutment welding of solid bars made of synthetic material, used for instance for handrails of stairs or for the edges of stair steps, takes place in such a manner that a heating plate is inserted between the spaced parallel end faces of the solid bars facing each other so that the end faces are heated to fusion temperature and after this has been done the heating plates are removed and the solid bars are pressed together and in this manner are welded together. In similar manner mitered faces of solid bar-shaped members of synthetic material may be welded together.

It is an object of the present invention, however, to unit by means of butt-welding hollow or tubular bar-shaped structural elements made of steel or other metal and whose exterior is covered by a sleeve of synthetic material.

In accordance with the present invention, the structural members of the type mentioned are prepared in such a manner that at the ends which are to be welded together the sleeves of synthetic material are so arranged to project a small distance beyond the ends of the inner tubular metal parts or end-drilled solid metal parts. The distance of the projecting portion of the synthetic material is calculated to be sufficient as is necessary to produce a good welded bond between the abutting ends. Furthermore, there is inserted between the two adjacent structural members to be united with each other a coupling member which is inserted into the bores of the inner solid metal parts or into the hollow spaces of the inner tubular metal parts. Before the structural members are moved in abutment with each other a narrow gap is caused to remain between the adjacent ends of the synthetic sleeves. Into this gap are inserted heating plates against which the ends of the synthetic sleeves are pressed until the synthetic material becomes sufficiently heated, whereupon the heating plates are removed from the gap and then the structural members are slidably moved with reference to the coupling member and are pressed tightly with their ends together, so that the inner metallic parts engage each other while at the same time the synthetic sleeves of the synthetic material are fused together or in other words are welded together.

It is also an object of the present invention to provide a device which is suitable for practicing the method of the present invention. There is described, by way of example, in the following description a device suitable for uniting two mitered structural members which form together the corner of a window or of a door frame. In particular, the structural members employed consist each of a steel pipe which is rectangular in cross section and is provided with or surrounded by a sleeve of thermoplastic synthetic material. The outer wall of this sleeve is provided with lengthwise extending ribs to form a suitable profile to be used for instance in a window frame. In such a device in which mitered structural members are to be united, two oppositely movable heating plates are employed which are provided with recesses for the purpose of surrounuding temporarily during the heating operation a rectangular coupling member, which extends with its legs into the ends of the inner metallic parts of the structural members to be united.

In the production of other building units which are provided with crossing points, it may be necessary to employ three or more heating plates. These heating plates are constructed in such a manner that they are able to surround the cross sectional shape of the inner coupling member and then are again removed from the coupling member so that the structural members may be moved in abutment with each other for the purpose of being united. The heating plates are constructed in such a manner that they are able to heat the thermoplastic synthetic material to a fusion temperature and this is preferably done electrically. The heating plates are also so constructed and arranged that they are able to heat the synthetic material of the structural elements at the point where a joint is to be produced uniformly and quickly, and since the temperature range is usually limited, the heat produced by the heating plates has to be kept constant, for which purpose suitable control devices are employed.

The invention will now be described in more detail in the following description of one particular method and a device forming, by way of example, a specific embodiment of the invention when read in conjunction with the accompanying drawings in which:

Figure 1 is a vertical cross sectional view of a device suitable for uniting two or more bar-shaped structural members of the type described, Figure 2 is a horizontal cross sectional view along the line II—II of Figure 1, Figure 3 is a top plan view of the device with two bar-shaped structural members in position to be united. The upper heating plate has been omitted for the purpose of making the disclosure somewhat clearer.

Figure 4 is a vertical cross sectional view along the line IV—IV of Figure 3, and Figure 5 is a cross sectional view of one of the structural members substantially along the line V—V of Figure 3.

Referring to the drawings, particularly Figure 3, two structural members $P_1$ and $P_2$ are mitered at G for the purpose of being butt-welded together. Each one of the structural members, as shown by way of example, particularly in Figure 5, consists of an inner hollow rectangular part 1 or a pipe made of steel or other metal which is covered by a sleeve 2 or a layer of thermoplastic synthetic material. The sleeve 2 is provided on its exterior with two lengthwise and outwardly extending ribs 2a and 2b.

According to the method of the invention hollow structural members of this type are to be welded together to form a corner joint. The structural members at the ends, where the miter G is produced, is prepared in such a manner that the synthetic material layer projects beyond the end faces of the inner metallic pipes 1 a predetermined distance U. The end faces and the inner walls of the metallic pipes 1 are coated with an adhesive suitable to unite metallic parts. Thereupon a coupling angle 3, whose cross sectional area corresponds to the cross sectional area of the bore of the pipes 1 is inserted in the pipes. The ends of the coupling angle 3 are indicated at 3a and 3b. The coupling angle 3 as shown in Figure 5, may have for instance a U-shaped cross sectional area. The structural members $P_1$ and $P_2$ are slidably moved upon the legs of the coupling angle 3 so far that a gap S remains between the opposing ends of the structural members $P_1$ and $P_2$. Thereupon two heating plates 4a and 4b are moved from below and from above into the mentioned slot S. These heating plates, according to Figure 4, are provided with rectangular recesses 4' and 4" which correspond to the cross sectional area of the coupling angle 3 whose legs extend into the structural members $P_1$ and $P_2$ so that when the heating plates are completely moved inwardly into their operative position the recesses 4' and 4" correspond exactly to the cross sectional area of the coupling angle 3 and surround the latter completely.

After the heating plates have been moved into the gap S the two adjacent ends of the sleeve 2 of synthetic material are pressed against the heating plates in such a manner that the synthetic material is heated and that the projections U are fused to about one half of their length. The structural members $P_1$ and $P_2$ are then withdrawn to their initial position, the two heating plates 4a and 4b are moved away from the coupling angle 3 and thereupon the structural members $P_1$ and $P_2$ are again moved towards each other and pressed together in such a manner that the inner metallic pipes 1 about one another while at the same time the fused mitered edges of the sleeves of synthetic material are welded together.

In the following is described a preferred embodiment of a device which may be employed for practicing the above described method of the invention.

In a housing 5, whose upper wall forms a horizontal table surface 5a, is mounted an electric motor 6 which drives by means of a gearing in a gear box 7 a vertical shaft 7a. The upper end of the shaft 7a has secured thereto a horizontal circular disc 8, on the lower face of which is arranged a circular wall, the lower edge of which forms a cam 9 (Figures 1 and 4). The upper face of the disc 8 has mounted therein in suitable bearings four pairs of rollers 10a, 10b, 11a and 11b, which are arranged 90° spaced from each other. The rollers are each loosely rotatable in said disc 8 about a vertical axis.

The lower edge of the circular cam 9, as particularly shown in Figure 1, is engaged by two rollers 12a and 12b which are mounted on lever arms 15a and 15b between the ends thereof. The lever arms 15a and 15b are mounted in the housing 5 and extend substantially horizontally. The inwardly arranged ends of the lever arms 15a and 15b are pivotally supported within the housing at 13a and 13b respectively, and springs 14a and 14b respectively have the tendency to urge the lever arms 15a and 15b upwardly so that the rollers 12a and 12b are maintained in engagement with the cam 9. The outer ends of the lever arms 15a and 15b are rotatably attached to the lower ends of vertical rods 16a and 16b which extend upwardly through the table surfaces 5a and have attached to their upper ends the substantially horizontally arranged rods 17a and 17b respectively. The free or inwardly extending ends of the rods 17a and 17b are each provided with an electric heating element 18a and 18b respectively. The heating elements 18a and 18b are arranged in such a manner that they are positioned in spaced vertical alignment one above the other. The lower heating element 18a has attached thereto an upwardly extending heating plate 4a. The upper heating element 18b has attached thereto a downwardly extending heating plate 4b.

The four pairs of rollers 10a, 10b, 11a and 11b cooperate with cams 19a, 19b, 19c and 19d which extend along a circular path and are 90° spaced from one another. These cams 19a, 19b, 19c and 19d are arranged on the bottom surface of horizontal plates 20a, 20b, 20c and 20d. These plates in turn are secured to the lower faces of slidable carriages 21a, 21b, 21c and 21d which according to the Figures 3 and 4 are slidably supported in radial guide-ways 22a, 22b, 22c and 22d arranged on the upper face of the table surface 5a. The radial movement of the slidable carriages is controlled by the cam carrying plates 20a, 20b, 20c and 20d and normally tension springs 23a, 23b, 23c and 23d have the tendency to move the carriages away from the center axis of the housing 5.

The carriages 21a, 21b, 21c and 21d are employed for clamping thereon the structural members $P_1$ and $P_2$ which are to be butt-welded at their ends as shown in Figures 3 and 4. Each carriage, as shown for example in Figure 4, is provided with a clamping device C consisting of a clamping jaw 26 adapted to be brought in engagement with the structural members placed on the carriage by means of an eccentric 27 actuated by a handle 28 and mounted pivotally at 31 in a bracket 30 extending upwardly from the carriage.

According to Figure 2 the cam carrying plates 20a, 20b, 20c and 20d are urged into the inoperative or outermost position of the device by the tension springs 23a, 23b, 23c and 23d. After the structural members $P_1$ and $P_2$ are secured on the carriages 21a and 21c as shown in Figures 3 and 4 which are radially movable in directions at 90° from each other, the device may be set in operation by energizing the electric motor 6 so that the circular disc 8 is set into rotation as shown by the arrow D in Figure 2. The cam 9 on the lower face of the disc 8, as shown in Figure 1, indicates that the roller 12a is about to leave a high portion of the cam 9 while the roller 12b has just engaged a lower point of the cam 9. The result will be that upon rotation of the cam 9 the lever 15a, under the action of the spring 14a, will be moved upwardly, while the lever arm 15b will be moved downwardly under the action of a higher portion of cam 9. This again has the result that the vertical rods 16a and 16b will move in opposite direction and will move the heating plates 4a and 4b towards each other so that their recesses 4' and 4", as shown in Figure 4, will form a close rectangle and the area of this rectangle is the same as the cross section of the connecting angle 3 which will be completely surrounded by the heating plates 4a and 4b as soon as the plates 4' and 4" have completed their movement in opposite or into their operative position.

While this takes place the outermost roller 10a and the innermost roller 11b on the top face of the disc 8 (Figures 1 and 2) will engage the cams 19a and 19b respectively, so that the cam plates 20a and 20b respectively will be actuated and the result is that the two carriages 21a and 21b together with the structural members $P_1$ and $P_2$ secured thereon are moved in a direction to approach one another until they engage the two heating plates 4a and 4b respectively.

After the previously carefully determined length of the projecting portions of the thermoplastic synthetic material sleeves have been heated to a predetermined temperature, the rollers 10a and 11b move away from the respecting cams 19a and 19b respectively, during the continuous rotation of the disc 8 so that the carriages 21a and 21b under the action of their springs 23a and 23b move again away from each other, which of course, has the result that the structural members $P_1$ and $P_2$ are also moved away from each other. After a short period of time the cam 9 on the lower face of the disc 8 causes the roller 12b to move upwardly while the roller 12a is moved downwardly so that the lever cams 15b and 15a are moved again into the position shown in Figure 1 in which the heating plates 4b and 4a are spaced vertically from each other and have been moved into their initial inoperative position.

In the meantime the outer roller 11a, which in Figure 2 is shown as positioned between the lower plates 20c and 20d has approached the cam 19a. Since now the outer rollers 11a and 11b and the inner rollers 10a and 10b are positioned closer to the axis of rotation of the disc 8 than the outer rollers 10a and 10b and the inner rollers 11a and 11b it happens that when the outer roller 11a engages the cam 19a and when the inner roller 10a engages the cam 19b that the cam plate 20a and 20b are again moved inwardly, but at this time they move beyond the previous inner position so that the structural members P₁ and P₂ clamped onto these carriages 21a and 21b are now pressed in abutment with one another and are welded together.

The displacement of the sleeve of synthetic material on the inner metallic carrier part for the purpose of producing the projection beyond the end of the metallic part, which projection is indicated with U and is used for causing the welded seam, can be produced mechanically or thermically. In the described embodiment the invention is described, by way of example, in connection with two mitered structural members which are to be united by means of the described butt-welding method. If, however, the structural members are to be united to form a cross, it is obvious that then all four carriages 21a, 21b, 21c and 21d of the device are to be used. Each of these carriages will have attached thereto one of the four structural members to be welded together. Obviously, the operation of the device with four carriages is the same as described with two carriages and it is also obvious that the recesses in the heating plates will have to be shaped accordingly.

What we claim is:

1. In a device for butt-welding tubular ends of bar-shaped structural members consisting each of an inner metallic part covered by a sleeve of thermoplastic synthetic material in which the thermoplastic synthetic sleeve projects a predetermined distance beyond the ends of the inner metallic parts of the structural members to be joined together, a housing having a top wall, a plurality of carriages slidably mounted on said top wall, means for moving said carriages radially simultaneously toward and away from the center of said top wall, clamping means for attaching the structural members to be joined together on said carriages with the inner ends of said members arranged in spaced apart relation, heating means arranged to move vertically at right angles to said structural members toward and away from the inner adjacent ends of the same, means for moving said heating means in cooperation with said carriage moving means so as to cause the adjacent ends of said synthetic sleeves to engage said heating means to be heated and then to remove the inner ends of said structural members from said heating means, said carriage moving means then causing said heating means to move vertically above and below the plane of said structural members and out of the path of said structural members and again causing said carriages to move toward each other an increased distance to bring the ends of the inner metallic parts of said structural members in to abutment and effecting a welding of the heated adjacent ends of the thermoplastic synthetic sleeves.

2. In a device for butt-welding tubular ends of bar-shaped structural members consisting each of an inner metallic part covered by a sleeve of thermoplastic synthetic material in which the thermoplastic synthetic sleeve projects a predetermined distance beyond the ends of the inner metallic parts of the structural members to be joined together, a housing having a top wall, a plurality of carriages slidably mounted on said wall and arranged for radial sliding movement, means including cam operated members for moving said carriages simultaneously toward and away from the center of said top wall, clamping means for attaching the structural members to be joined together on said carriages such that their inner ends are adjacent one another, heating plates arranged to be movable at right angles and in opposite directions to said structural members into and out of a gap formed between the adjacent inner ends of the same, a single cam means for moving said heating plates in cooperation with said cam operated members so as to cause the adjacent inner ends of said thermoplastic synthetic sleeves to engage said heating plates simultaneously and then to move the inner ends of said structural members simultaneously away from said heating plates, said cam operated members then causing said heating plates to move out of said gap between the inner ends of said structural members and again causing said carriages to move toward each other an increased distance to bring the ends of the inner metallic parts of said structural members to abutment and effecting a welding of the heated adjacent ends of the thermoplastic synthetic sleeves.

3. In a device for butt-welding tubular ends of bar-shaped structural members consisting each of an inner metallic part covered by a sleeve of thermoplastic synthetic material in which the thermoplastic synthetic sleeve projects a predetermined distance beyond the ends of the inner metallic parts of the structural members to be joined together, a housing having a horizontal top wall, a plurality of carriages slidably mounted on said top wall for sliding movement in directions radial from the center of said top wall, means including a single rotatable circular cam mounted in said housing below said top wall for moving said carriages simultaneously radially inward and outward with respect to the center of said top wall so that the inner ends of the structural members will be moved in closely spaced apart relation, clamping means for attaching the structural members to be joined together on said carriages, heating plates arranged to be movable at right angles and simultaneously in opposite directions to said structural members into and out of a gap formed between the adjacent ends of the same, means operatively connected with said circular cam for moving said heating plates in cooperation with said carriages so as to cause the adjacent ends of said synthetic sleeves to engage said heating plates when the latter are inserted in said gap and then to remove said structural members again from said heating plates, said rotatable cam then causing said heating plates to move out of said gap between said structural members and again causing said carriages to move toward each other an increased distance to bring the ends of the inner metallic parts of said structural members to abutment and effecting a welding of the heated adjacent ends of the thermoplastic synthetic sleeves.

4. In a device for automatically butt welding the ends of tubular bar shaped structural members each of which consists of an inner metallic part having a sleeve covering formed of thermoplastic synthetic material and in which the sleeve projects a predetermined distance beyond the ends of the inner metallic portion of the structural members to be joined together, a housing having a horizontal top wall provided with a centrally located recessed portion, radially extending ways formed in said top wall and extending from the central recessed portion, a plurality of carriages one of which is received in each of said ways, a driven shaft beneath said top wall, a cam disc on said shaft having cam members projecting from the radial walls thereof, push rods extending through said top wall, heating elements supported by said push rods and arranged for vertical movement in opposite directions toward and away from the inner ends of structural members supported by said carriages, said heating elements being provided with notched plates adapted to be initially engaged by the inner projecting ends of said sleeve members, said push rods being operated by the cam members on one of the radial walls of said cam disc and said carriages being moved radially by cam members on the other radial wall of said cam disc, the last mentioned cam members being arranged to move the carriages and structural members into and out of engagement with said notched plates and to again move said carriages and the structural members supported thereby into contactual engagement when the heating elements have been vertically displaced out of the path of the inner ends of said structural members.

5. In a device for automatically butt welding the ends of tubular bar shaped structural members each of which consists of an inner metallic member having a sleeve covering formed of thermoplastic synthetic material and in which the sleeve projects a predetermined distance beyond the ends of the inner metallic member of the tubular bar shaped structural members, a housing having a horizontal top wall, radially extending ways formed in said top wall, carriages slidably mounted in said ways for supporting a tubular structural member to extend longitudinally of said ways, clamping means for holding said structural members on said carriages, a power driven shaft extending vertically in said housing, a cam disc carried by said shaft having cam members on both radial walls thereof, push rods slidably mounted in said table top and arranged between certain adjacent ways, inwardly directed arms on said push rods extending toward the center of said top wall, a heating element mounted on each inwardly extending rod having a notched rib with the ribs arranged in opposed relation, cam members on one surface of said disc being adapted to move said heating elements in opposite directions in unison so that the ribs may be brought into abutting engagement and separated above and below the plane of said structural members, the cam members on the other radial wall of said disc being arranged to move said carriages inwardly so that the inner ends of the structural members will initially abutt the ribs of said heating element and to retract said carriages momentarily while the heating elements are moved vertically away from the plane of said structural members, the surfaces on said carriages engaged by said cam members being arranged to be engaged by another cam member on the same radial wall of said disc to again move said carriages inwardly until the inner ends of the structural members are pressed into contactual engagement in the region of the projecting portion of the thermoplastic sleeve whereby the preheated projecting portions of said sleeve at the inner ends of said structural members will be welded together.

References Cited in the file of this patent
UNITED STATES PATENTS

| | | |
|---|---|---|
| 1,753,386 | Paltrowitz | Apr. 8, 1930 |
| 2,384,014 | Cutter | Sept. 4, 1945 |
| 2,503,882 | Medford | Apr. 11, 1950 |
| 2,646,822 | Ferguson | July 28, 1953 |
| 2,665,738 | Caskin | Jan. 12, 1954 |